(12) United States Patent
Das et al.

(10) Patent No.: US 9,213,578 B2
(45) Date of Patent: Dec. 15, 2015

(54) CLUSTER SYSTEMS AND METHODS

(75) Inventors: Udipta Das, Maharashtra (IN); Amol Katkar, Pune (IN); Viraj Kamat, Maharashtra (IN); Praween Kumar, Pune (IN)

(73) Assignee: Symantec Corporation, Mountain View, CA (US)

( * ) Notice: Subject to any disclaimer, the term of this patent is extended or adjusted under 35 U.S.C. 154(b) by 668 days.

(21) Appl. No.: 13/294,995

(22) Filed: Nov. 11, 2011

(65) Prior Publication Data

US 2013/0124451 A1    May 16, 2013

(51) Int. Cl.
*G06N 5/02* (2006.01)
*G06F 9/50* (2006.01)

(52) U.S. Cl.
CPC .............. *G06F 9/5061* (2013.01); *G06N 5/02* (2013.01); *G06F 2209/508* (2013.01)

(58) Field of Classification Search
CPC .... G06F 9/5044; G06F 15/177; G06F 15/161
See application file for complete search history.

(56) References Cited

U.S. PATENT DOCUMENTS

| | | | |
|---|---|---|---|
| 7,392,421 B1* | 6/2008 | Bloomstein et al. | 714/4.4 |
| 7,457,824 B1* | 11/2008 | Strom et al. | 1/1 |
| 7,702,655 B1* | 4/2010 | Panelli et al. | 707/600 |
| 7,836,156 B1* | 11/2010 | Ou et al. | 709/220 |
| 7,860,919 B1* | 12/2010 | Patsenker et al. | 709/201 |
| 8,386,732 B1* | 2/2013 | Ninan et al. | 711/163 |
| 8,719,415 B1* | 5/2014 | Sirota et al. | 709/226 |

\* cited by examiner

*Primary Examiner* — Stanley K Hill
(74) *Attorney, Agent, or Firm* — Wilmer Cutler Pickering Hale and Dorr LLP

(57) ABSTRACT

Information cluster systems and methods are presented. In one embodiment, a cluster method comprises: performing an engine process including issuing requests to bring a resource online, offline, and monitor the resources, wherein the engine process is performed by an engine; performing a resource interaction process including interacting with a resource and directing a resource to comply with the request from the engine process, wherein the resource interaction process is performed by a resource interaction agent; performing a predicate logic process including performing predicate logic operations to determine if a predicate logic condition associated with the resource is satisfied and forwarding an indication of the results of the predicate logic operations to the engine process, wherein the predicate logic process is performed by a predicate logic agent that is separate from the engine performing the engine process.

20 Claims, 11 Drawing Sheets

500

510
Receiving an indication to perform a predicate logic operation.

520
Accessing information associated with the predicate logic operation.

530
Performing a Predicate Logic Operation.

540
Forwarding results of the predicate logic operation.

610
Receiving an indication to perform a predicate logic operation.

620
Accessing information associated with the predicate logic operation.

630
Performing a Predicate Logic Operation.

640
Forwarding results of the predicate logic operation.

650
Perform a supplemental process.

| 810
Engine Module. |
| 820
Resource Interaction Module. |
| 830
Predicate Logic Module. |

FIG 8

CLUSTER SYSTEMS AND METHODS

FIELD OF THE INVENTION

The present embodiments relate to the field of cluster resource availability for applications and storage of information. In one embodiment, a predicate logic extensible cluster system and method is implemented.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. These resources can be organized and arranged in cluster architectures.

Traditional mechanisms for implementing cluster configuration and organization are often very complex and rigid. Conventional cluster architecture approaches typically make it difficult to keep pace with the ever rapidly changing situations and environments associated with information storage. Some conventional engines utilized in traditional cluster architectures are very complex and complicated and attempts to modify or enhance the engine to handle new or extensible capabilities can be very difficult and susceptible to numerous errors.

SUMMARY

Information cluster systems and methods are presented. In one embodiment, a cluster method comprises: performing an engine process including issuing requests to bring a resource online, offline, and monitor the resource, wherein the engine process is performed by an engine; performing a resource interaction process including interacting with the resource and directing the resource to comply with the request from the engine process, wherein the resource interaction process is performed by a resource interaction agent; performing a predicate logic process including performing predicate logic operations to determine if a predicate logic condition associated with the resource is satisfied and forwarding an indication of the results of the predicate logic operations to the engine process, wherein the predicate logic process is performed by a predicate logic agent that is separate from the engine performing the engine process.

In one embodiment, the predicate logic process utilizes information from the resource interaction process in determining if the predicate logic condition associated with the resource is satisfied. The predicate logic process can forward an indication the predicate logic agent is online if the predicate logic condition is satisfied and forwards an indication the predicate logic agent is offline if the predicate logic condition is not satisfied. The predicate logic process can include a threshold operation that determines if a requisite number of resources are online. The predicate logic process can include a Boolean logic operation that determines if the status of a requisite number of resources satisfy a Boolean relationship. The predicate logic process can include a comparative operation. In one exemplary implementation, a notifier script can be performed in response to information from the resource interaction process.

In one embodiment, a reprogrammable tangible computer readable medium having stored thereon, computer executable instructions that when executed by a computer system cause the computer system to perform a method comprising: performing an engine process including issuing requests to bring a resource online, offline, and monitor the resource, wherein the engine process is performed by an engine; performing the resource interaction process including interacting with the resource and directing a resource to comply with the request from the engine process, wherein the resource interaction process is performed by a resource interaction agent; performing a predicate logic process including performing predicate logic operations to determine if a predicate logic condition associated with the resource is satisfied and forwarding an indication of the results of the predicate logic operations to the engine process, wherein the predicate logic process is performed by a predicate logic agent that is separate from the engine performing the engine process.

In one embodiment, the predicate logic process utilizes information from the resource interaction process in determining if the predicate logic condition associated with the resource is satisfied. The predicate logic process can forward an indication the predicate logic agent is online if the predicate logic condition is satisfied and forwards an indication the predicate logic agent is offline if the predicate logic condition is not satisfied. The predicate logic process can include a threshold operation that determines if a requisite number of resources are online. The predicate logic process can include a Boolean logic operation that determines if the status of a requisite number of resources satisfy a Boolean relationship. The predicate logic process can include a comparative operation. In one exemplary implementation, a notifier script can be performed in response to information from the resource interaction process.

In one embodiment, a computer system comprising: a processor coupled to a computer readable storage media and executing computer readable code which causes the computer system to perform operations including: performing an engine process including issuing requests to bring a resource online, offline, and monitor the resource, wherein the engine process is performed by an engine; performing a resource interaction process including interacting with the resource and directing the resource to comply with the request from the engine process, wherein the resource interaction process is performed by a resource interaction agent; performing a predicate logic process including performing predicate logic operations to determine if a predicate logic condition associated with the resource is satisfied and forwarding an indication of the results of the predicate logic operations to the engine process, wherein the predicate logic process is performed by a predicate logic agent that is separate from the engine performing the engine process.

In one embodiment, the predicate logic process utilizes information from the resource interaction process in determining if the predicate logic condition associated with the resource is satisfied. The predicate logic process can forward an indication the predicate logic agent is online if the predicate logic condition is satisfied and forwards an indication the predicate logic agent is offline if the predicate logic condition is not satisfied. The predicate logic process can include a threshold operation that determines if a requisite number of resources are online. The predicate logic process can include a Boolean logic operation that determines if the status of a requisite number of resources satisfy a Boolean relationship. The predicate logic process can include a comparative operation. In one exemplary implementation, a notifier script can be performed in response to information from the resource interaction process.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 5 is a flow chart of an exemplary predicate logic process in accordance with one embodiment of the present invention.

FIG. 6 is a flow chart of an exemplary predicate logic process in accordance with one embodiment of the present invention.

FIG. 8 is a block diagram of an exemplary cluster module which includes instructions for directing a processor in the performance of a cluster method in accordance with one embodiment of the present invention.

DETAILED DESCRIPTION

Figure 1:
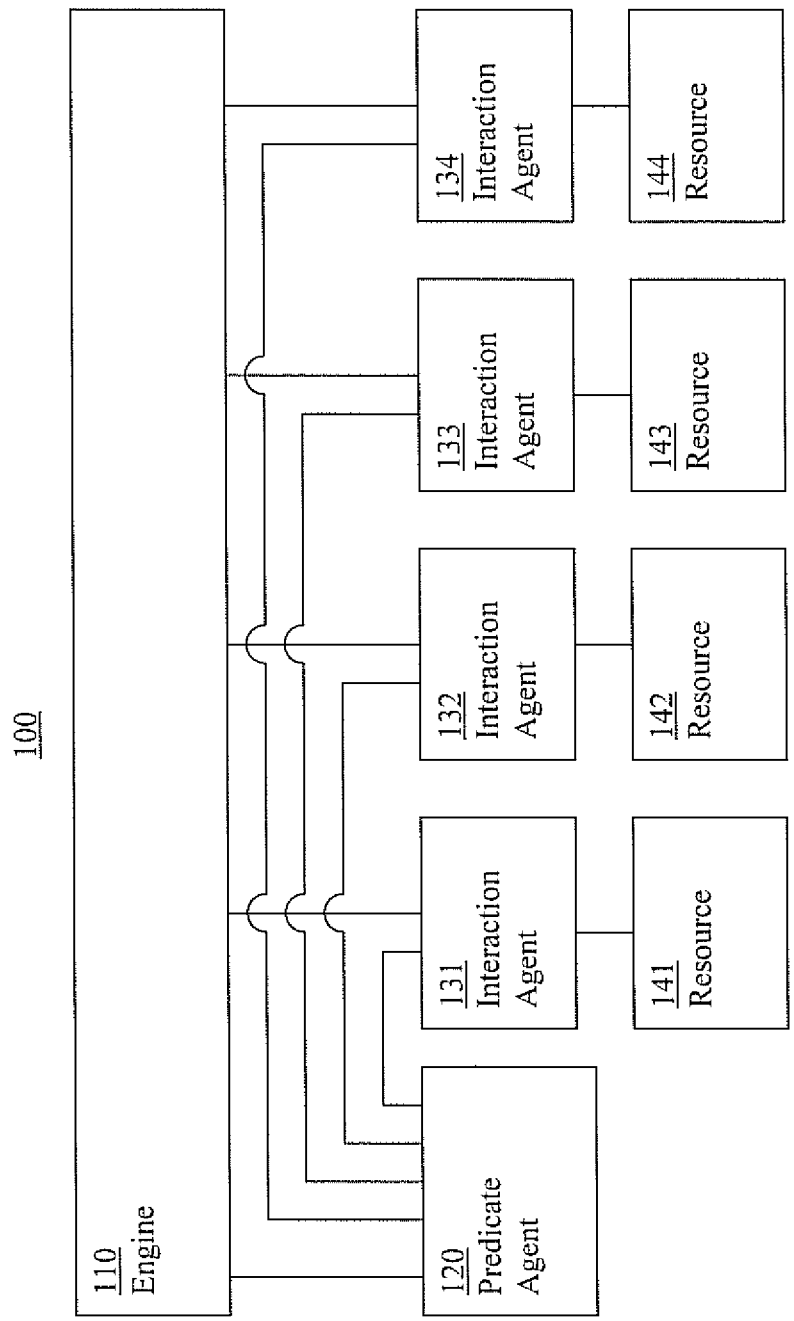
FIG. 1 is a block diagram of an exemplary cluster system with one predicate logic agent in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

The presented systems and methods described in the following sections of the detailed description can facilitate efficient and effective cluster configuration. In one embodiment, the systems and methods enable extension of cluster core functionality policies. The systems and methods can include flexible and scalable predicate logic implementation with minimal or no changes to existing mechanisms (e.g., engines, resource interaction agents, resources, etc). Cluster systems can be conveniently and flexibly expanded to enable predicate logic operations to be executed based upon states (e.g., online, offline, fault, etc.) of cluster resources. The core logic of resource dependency can be freely extended in a versatile and elegant manner.

Systems and methods described herein can allow a user to extend clustering core logic using a variety of arbitrary predicate logic. In one embodiment, the predicate logic can be combined with notifier scripts to build a complex logic to action workflow. In one embodiment, the predicate logic is included in a new type of cluster component or module (e.g., a predicate logic agent, a predicate logic process, etc.). In one exemplary implementation, the predicate logic performs logic operations or based on states of other resources of any type, including other predicate logic resources, enabling a rich set of logic to be implemented that can extend the functionality of the clustering core.

In one embodiment, predicate logic is "segregated" in a predicate logic agent or module that communicates with other components or modules (e.g., an engine, a resource interaction agent, etc.). The predicate logic can be performed by the predicate logic agent with minimal or no alteration (e.g., modifications, changes, recoding, etc.) impact to the other components. An individual predicate logic agent or module is relatively focused on a single or few types of logic operations. Multiple individual predicate logic agents can be coordinated or configured to cooperatively operate to enable more complex predicate logic. In one exemplary implementation, a first predicate logic agent is focused on a single first threshold operation (e.g., at least five 1 GB disks are online, etc.), a second predicate logic agent is focused on a single second threshold operation (e.g., two IP addresses are accessible, etc.) and a third predicate logic agent is focused on a single Boolean operation (e.g., AND, etc.). The first, second and third predicate logic agents while individually relatively simple can cooperatively operate to perform more complex predicate logic (e.g., at least five 1 GB disks are online AND two IP addresses are accessible, etc.). In one embodiment, predicate logic agents can be included in a service group and the corresponding predicate logic has to be satisfied for the service group to be considered available.

The predicate logic agents can be implemented with interfaces compatible with other components (e.g., engines, resource interaction agents, etc.) to simplify communication with minimal or no changes to interfaces of existing components or modules. In one embodiment, an interface between various components or modules (e.g., engine, predicate logic agent, resource interaction agent, resource, etc.) has a fixed and rigid application program interface (API) set. In one exemplary implementation, the interface can be limited to communicating a relatively small number items (e.g., online, offline, monitor, etc.).

FIG. 1 is a block diagram of exemplary cluster system 100 in accordance with one embodiment of the present invention. Cluster system 100 includes engine 110, predicate logic agent 120, resource interaction agent 131, resource interaction agent 132, resource interaction agent 133, resource interaction agent 134, resource 141, resource 142, resource 143, and resource 144. Engine 110 is communicatively coupled to predicate logic agent 120, interaction agent 131, interaction agent 132, interaction agent 133, and interaction agent 134. Predicate logic agent 120 is communicatively coupled to interaction agents 131, 132, 133 and 134. Interaction agent 131 is communicatively coupled to resource 141. Interaction agent 132 is communicatively coupled to resource 142. Interaction agent 133 is communicatively coupled to resource 143. Interaction agent 134 is communicatively coupled to resource 144. The components of cluster system 100 cooperatively operate to perform cluster configuration and organization operations. Additional information on cluster system 100 component exemplary operations are set forth if following sections of the detailed description.

Engine 110 performs cluster configuration operations. In one embodiment, the cluster configuration operations include decisions based on resource availability. Engine 100 communicates with predicate logic agent 120 to request results of predicate logic operations. Engine 100 communicates information to resource interaction agent 131, resource interaction agent 132, resource interaction agent 133, and resource interaction agent 134. In one embodiment, engine 100 communicates requests to the resource interaction agent 131, resource interaction agent 132, resource interaction agent 133, and resource interaction agent 134. Engine 110 can communicate a variety of requests (e.g., request to bring a resource up or online, request to bring a resource down or offline, request a report on the status of a resource, etc.) to the resource interaction agents.

Resource interaction agent 131, resource interaction agent 132, resource interaction agent 133, resource interaction agent 134, interact with resource 141, resource 142, resource 143, and resource 144, respectively. A resource interaction agent can engage in a variety of interactions with a resource. In one embodiment, resource agents 131, 132, 133 and 134 interact with corresponding agents 141, 142, 143 and 144 in response to requests from engine 110. In one exemplary implementation, a resource interaction agent directs a "switch" or "switching" operation (e.g., instructs a resource to switch on, switch off, etc.). A resource interaction agent can instruct a resource to come up or come online. A resource interaction agent can instruct a resource to come down or come offline. A resource interaction agent can monitor a resource. It is appreciated a resource interaction agent can perform a variety of monitoring operations (e.g., monitor if the resource is online, offline, operating correctly, has a fault, etc). In one embodiment, resource interaction agents 131, 132, 133, and 134 can forward the results of the respective monitoring to engine 110. In one exemplary implementation, resource interaction agents 131, 132, 133, and 134 can forward the results of the respective monitoring to predicate logic agent 120 also.

Resource 141, resource 142, resource 143, and resource 144 can perform resource operations. It is appreciated there can be a variety of different resources. A resource can include a Network Interface Card (NIC) for interfacing with a network. A resource can include a Internet Protocol (IP) resource (e.g., IP address, IP location, IP site, etc.). A resource can include a storage resource (e.g., a disk, a memory, etc.). A resource can include a file system. In one embodiment, the resources are utilized to support various cluster operations (e.g., storing information, communicating information, etc.) for a cluster. In one exemplary implementation, the cluster is configured by engine 110.

Predicate logic agent 120 performs predicate logic operations. The predicate logic operations can include checking on a characteristic or feature of one or more resources. In one embodiment, the characteristics or features can include a property, relation, attribute, quality, or condition (e.g., online, offline, operating, fault, available, not available, etc.). In one embodiment, a predicate logic agent communicates with the resource interaction agents and facilitates coordination of responses from the resource interaction agents. It is appreciated that there can be a variety of different predicate logic implemented by predicate logic agent components or modules.

In one embodiment, the predicate logic operations include a threshold operation. The threshold operation can include determining if resources satisfy a threshold. In one exemplary implementation, the predicate logic determines if a threshold relationship (e.g., equal to, greater than, less than, greater than or equal to, less than or equal to, etc.) is satisfied by resources. The predicate logic operations can include determining if there are a threshold requisite number (e.g., greater than 5, at least 3, etc.) NICs online. The predicate logic operations can include determining if there are a threshold or requisite number (e.g., greater than 7, at least 7, etc.) disks online.

In one embodiment, the predicate logic operations include a Boolean operation. The Boolean operation can include determining if resources satisfy a Boolean condition. It is appreciated there can be a variety of Boolean conditions (e.g., OR, AND, NOR, XOR, etc.). The predicate logic operations can include determining if a requisite Boolean condition is satisfied by NICs online (e.g., one 10 GB NIC OR four 1 GB NICs online, one 2 GB NICs AND three 4 GB NICs online, etc.). The predicate logic operations can include determining if a requisite Boolean condition is satisfied by disks online (e.g., one 4 GB disk OR four 1 GB disks online, one 8 GB disks AND three 1 GB disks online, etc.).

Predicate logic agent 120 can forward an indication of the results of the predicate logic operations. In one embodiment, the predicate logic agent 120 forwards an indication a predicate logic agent is online if the predicate logic condition is satisfied or true (e.g., a requisite threshold is met, a requisite Boolean condition exists, etc.). In one exemplary implementation, engine 110 requests predicate logic agents 120 to come online and predicate logic agent 120 checks with resource interaction agent 131, resource interaction agent 132, resource interaction agent 133, and resource interaction agent 134 on the status (e.g., online, offline, etc.) of resource 141, resource 142, resource 143, and resource 144, respectively. Based upon the information received from the resource interaction agents, predicate logic agent 120 determines if a predicate logic condition is true or exists. If the predicate logic condition is true or exists, predicate logic agent 120 reports back to engine 110 that predicate logic agent 120 is online. If the predicate logic condition is not true or does not exist, predicate logic agent 120 reports back to engine 110 that predicate logic agent 120 is offline.

In one embodiment, the predicate logic agent component or module is separate and distinct from the engine component or module. The predicate logic instructions or operations can be implemented with minimal or no change to engine instructions or operations. In one exemplary implementation, predicate logic instructions are implemented in or by the predicate logic agent component or module with only a minimal change to the engine instructions or operations to recognize or receive an indication of the results of the predicate logic instructions or operations performed by the predicate logic agent component or module. In one exemplary implementation, predicate logic is implemented by coded instructions in the predicate logic agent component or module and coded instructions in the engine component or module are not altered or minimally altered.

In one embodiment, predicate logic operations of a predicate logic agent component or module are "agnostic" or don't care as to the type of resource the predicate logic is being applied to and the predicate logic agent can be utilized in a variety of applications. In one exemplary implementation, a predicate logic agent operations are directed to determining if 75% of the resource interaction agents examined by the predicate logic agent indicate that corresponding resources are online. In this scenario, the predicate logic agent does not care what the resources are (e.g., NICs, disks, file system, etc.), the predicate logic agent reports itself online if 75% of the resources are online. This predicate logic agent or a duplicate of this predicate logic agent can be utilized in a cluster system where the 75% predicate logic is applied to NICs and can also be utilized in another cluster system where the 75% predicate logic is applied to disks.

It is appreciated that there can be a various different predicate logic operations which can be coordinated in a variety of different ways. Various different predicate logic operations can be coordinated at multiple levels of predicate logic.

Figure 2:
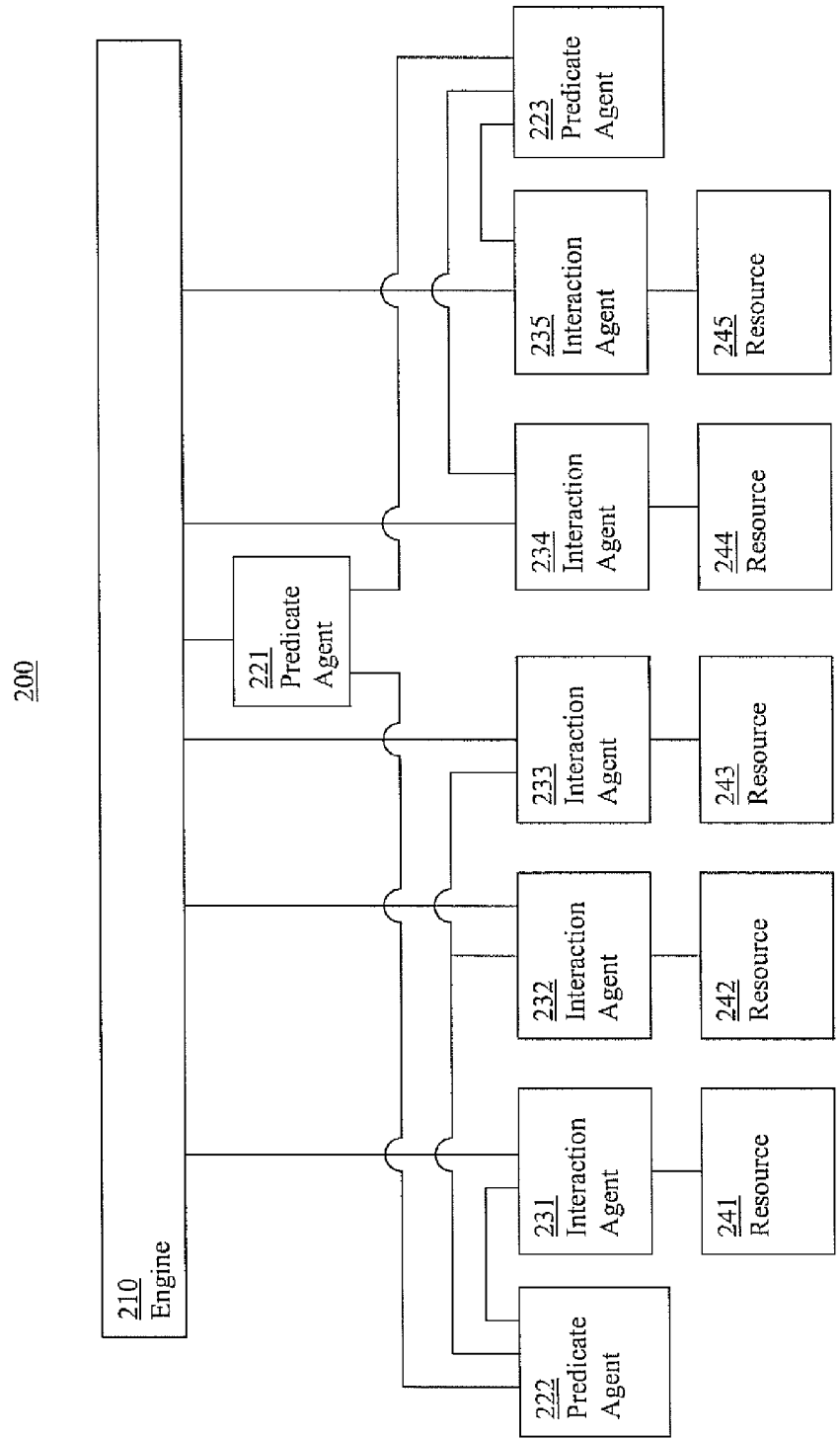
FIG. 2 is a block diagram of an exemplary cluster system with multiple predicate logic agents in accordance with one embodiment of the present invention.

FIG. 2 is a block diagram of exemplary cluster system 200 in accordance with one embodiment of the present invention. Cluster system 200 includes engine 210, predicate logic agent 221, predicate logic agent 222, predicate logic agent 223, resource interaction agent 231, resource interaction agent 232, resource interaction agent 233, resource interaction agent 234, resource interaction agent 235, resource 241, resource 242, resource 243, resource 244 and resource 245. Engine 210 is communicatively coupled to predicate logic agent 221, interaction agents 231, 232, 233, 234 and 235. Predicate logic agent 221 is communicatively coupled to predicate logic agent 222 and predicate logic agent 223. Predicate logic agent 222 is communicatively coupled to resource interaction agents 231, 232, and 233. Predicate logic agent 223 is communicatively coupled to resource interaction agents 234 and 235. Interaction agents 231, 232, 234 and 235 are communicatively coupled to resources 241, 242, 243 and 245 respectively.

The components of cluster system 200 cooperatively operate to perform cluster storage operations. Many of the components of cluster system 200 are similar to components of cluster system 100. Engine 210 is similar to engine 110. Resource interaction agents 231, 232, 233, 234, and 235 are similar to resource interaction agents 131, 132, 133, and 134. Resources 241, 242, 243, 244 and 245 are similar to resources 141, 142, 143, and 144. Predicate logic agents 221, 222 and 223 can perform predicate logic operations similar to predicate logic agent 120 except predicate logic agent 221 can perform the predicate logic operations based upon information received from predicate logic agents 222 and 223. Predicate logic agents 222 performs predicate logic operations based upon information received from the resource interaction components 231, 232 and 233. Predicate logic agents 223 performs predicate logic operations based upon information received from the resource interaction components 234 and 235. Predicate logic agent 221 can be considered to perform predicate logic operations at a different "level" from predicate logic agents 222 and 223 since the predicate logic operations of predicate logic agent 221 are based upon information from predicate logic agents 222 and 223. In one embodiment, predicate logic agent 221 performs a Boolean operation (e.g., OR, AND, etc.) of threshold operations (e.g., greater than or equal to, at least, etc.) performed by predicate logic agents 222 and 223.

Figure 3:
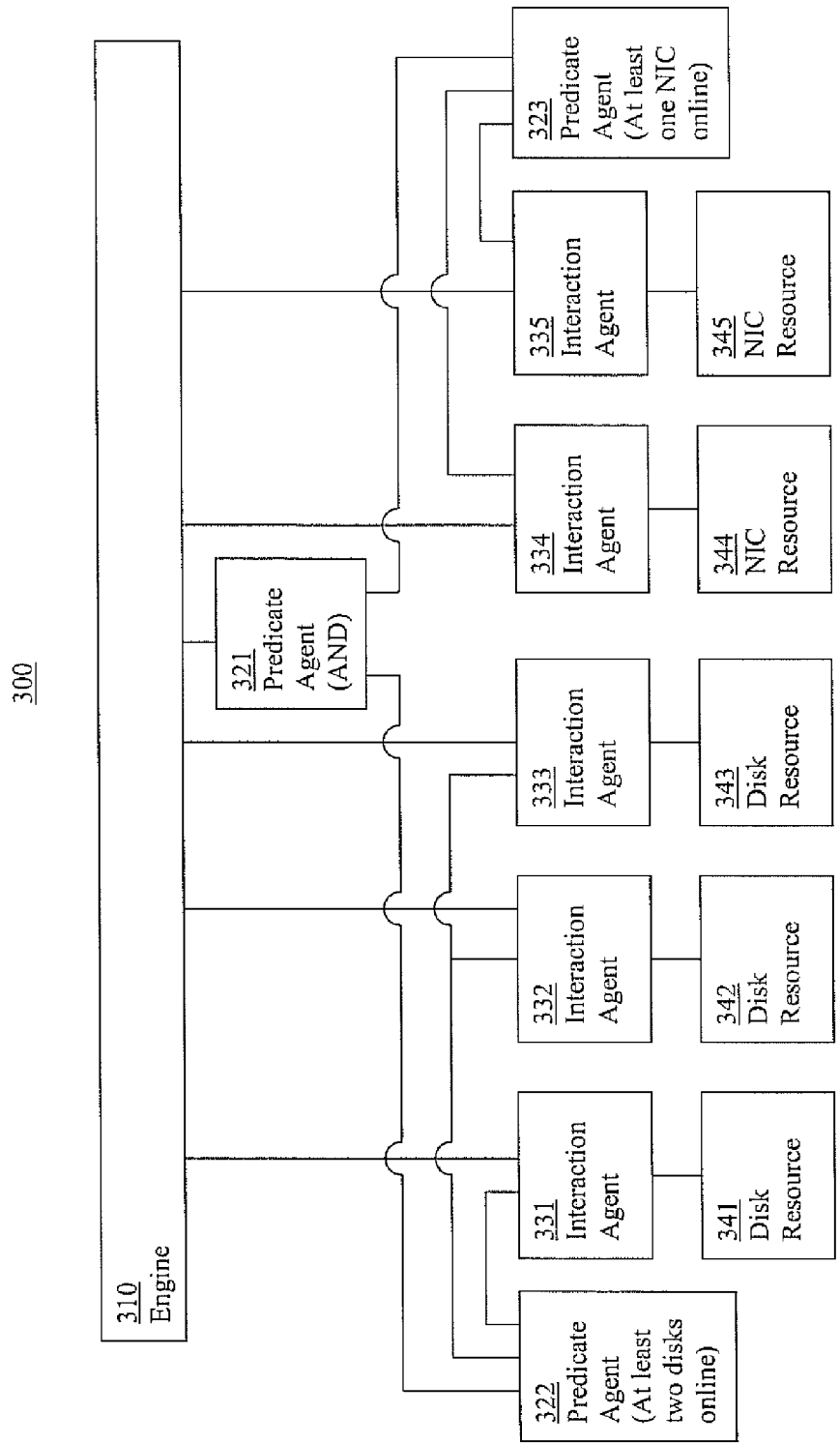
FIG. 3 is a block diagram of an exemplary cluster system with layered hierarchy of predicate logic agents in accordance with one embodiment of the present invention.

FIG. 3 is a block diagram of exemplary cluster system 300 in accordance with one embodiment of the present invention. Cluster system 300 is similar to cluster system 200. Cluster system 300 includes engine 310, predicate logic agents 321, 322, and 323, resource interaction agents 331, 332, 333, 334, and 235, and resources 341, 342, 343, 344 and 345. In cluster system 300 resources 341, 342 and 343 are disks and resources 344 and 345 are NICs. Predicate logic agent 322 performs predicate operations including analyzing if at least two disks are available and online. Predicate logic agent 323 performs predicate operations including analyzing if at least one NIC is available and online. Predicate logic agent 321 performs predicate logic operations, including determining if both the conditions of predicate logic agents 322 and 323 are satisfied. In one exemplary implementation, predicate logic agent 321 reports itself online to engine 310 if at least two disks are online and at least NIC is online.

It is appreciated that cluster systems and methods can include service groups. In one embodiment, a service group includes a set of resources. In addition to predicate logic being applied on a resource state condition, it is also appreciated that predicate logic can be applied on a basis of a service group state condition. With reference back to FIG. 2, in one embodiment, resources 241, 242 and 243 are assigned or included in a first service group and resources 234 and 235 are assigned or included in a second resource group. Predicate logic agent 222 can apply predicate logic configured to confirm a first service group is available and predicate logic agent 222 can apply predicate logic configured to confirm a second service group is available. In one exemplary implementation, for a first service group to be considered viably available two of the three resources 241, 242 and 243 have to be online and predicate logic agent 222 condition is directed to checking that the threshold level of two out of three is satisfied. In one exemplary implementation, for a second service group to be considered viably available both of the resources 244, and 245 have to be online and predicate logic agent 223 condition is directed to checking that the threshold level of both resources online is satisfied. In one embodiment, predicate logic agent 221 conditions can be considered to be directed at a state (e.g., online, offline, etc.) of a service group. In one exemplary implementation, a predicate logic agent 221 condition is either satisfied or not satisfied based upon the state of the first service group (as indicated by results from predicate logic agent 222) and the state of the second service group (as indicated by results from predicate logic agent 223). In one embodiment, a predicate logic agent is made a part of or included in a service group and can be marked as critical to indicate to an engine that if the predicate logic condition is not satisfied the service group can be considered offline or not available. In one exemplary implementation, the service group can be migrated elsewhere or to other resources.

Figure 4:
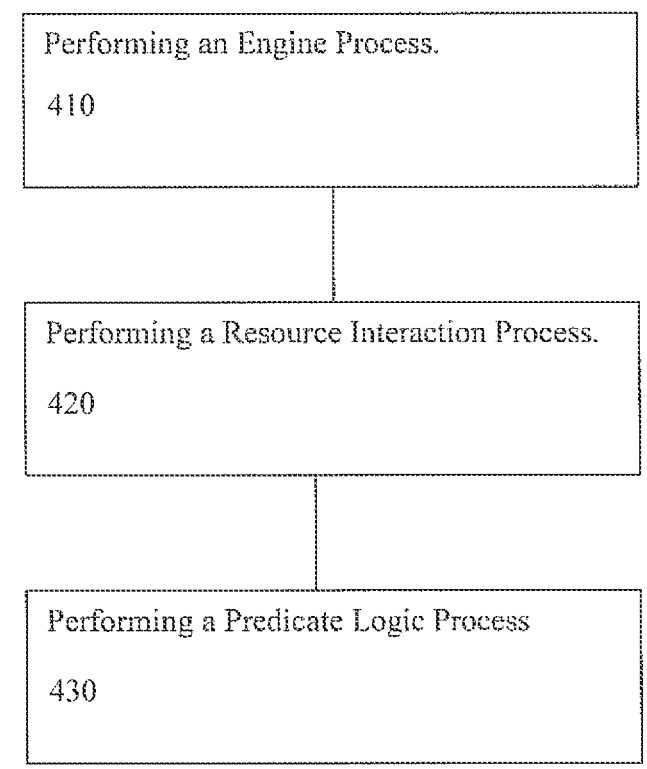
FIG. 4 is a flow chart of an exemplary cluster method in accordance with one embodiment of the present invention.

FIG. 4 is a flow chart of exemplary cluster method 400 in accordance with one embodiment of the present invention. In one embodiment, exemplary cluster method 400 is performed by a cluster system (e.g., cluster system 100, 200, etc.).

In block 410, an engine process is performed. In one embodiment, an engine process includes cluster configuration operations. The cluster configuration operations can include decisions based on resource availability. In one exemplary implementation, information is communicated to a resource interaction agent. The information can include a variety of requests (e.g., request to bring a resource up or online, request to bring a resource down or offline, request a report on the status of a resource, etc.). In one embodiment, an engine process periodically checks the state of a resource interaction process and a predicate logic process. In one exemplary implementation, the time between checking in with a predicate logic process (e.g., a predicate logic agent online/offline timeout, etc.) is slightly longer than the resource interaction process to allow the predicate logic to operate on the resource state information from the resource interaction processes.

In block 420, a resource interaction process is performed. The resource interaction process can include a variety of interactions with a resource. In one embodiment, the resource interaction process interacts with corresponding resources in response to requests from the engine process performed in block 410. In one exemplary implementation, a resource interaction process directs a "switch" or "switching" operation (e.g., instructs a resource to switch on, switch off, etc.). A resource interaction process can instruct a resource to come up or come online. A resource interaction process can instruct a resource to come down or come offline. A resource interaction process can monitor a resource. It is appreciated a resource interaction process can perform a variety of monitoring operations (e.g., monitor if the resource is online, offline, operating correctly, has a fault, etc). In one embodiment, resource interaction process can forward the results of the respective monitoring to the engine process of block 410.

In block 430, a predicate logic process is performed. In one embodiment, the predicate logic process is performed by a predicate logic agent that is separate from the engine performing the engine process. The predicate logic process can including performing predicate logic operations to determine if a predicate logic condition associated with the resource is satisfied. In one exemplary implementation, the predicate logic process utilizes and coordinates information from the resource interaction process in determining if the predicate logic condition associated with the resource is satisfied.

The predicate logic process can forward an indication of the results of the predicate logic operations. In one embodiment, the predicate logic process forwards an indication a predicate logic agent is online if the predicate logic condition is satisfied or true (e.g., a requisite threshold is met, a requisite Boolean condition exists, etc,). In one exemplary implementation, engine process of block 410 requests a predicate logic process to come online and the predicate logic process checks with a resource interaction process of block 420 on the status (e.g., online, offline, etc.) of a resource. Based upon information received from the resource interaction process, the predicate logic process determines if a predicate logic condition is true or exists. If the predicate logic condition is true or exists, the predicate logic process reports back to the engine process of block 410 that the predicate logic process is online. If the predicate logic condition is not true or does not exist, the predicate logic process reports back to the engine process of block 410 that the predicate logic process is offline.

FIG. 5 is a flow chart of an exemplary predicate logic process 500 in accordance with one embodiment of the present invention. In one embodiment, predicate logic process 500 is similar to the predicate logic process of block 430. In one exemplary implementation, predicate logic process 500 is performed by a predicate logic agent (e.g., predicate logic agent 120, 221, 222, etc.)

In block 510, an indication to perform a predicate logic operation is received. In one embodiment, the indication to perform a predicate logic operation is received from an engine process. In one exemplary implementation, the indication to perform a predicate logic operation includes a request from an engine process for a predicate logic process to come online.

In block 520, information associated with the predicate logic operation is accessed. In one embodiment, the information associated with the predicate logic operation is accessed from a resource interaction process. In one exemplary implementation, the information includes an indication on the status (e.g., online, offline, etc.) of a resource. In one embodiment, the information associated with the predicate logic operation is accessed from another predicate logic process. In one exemplary implementation, the predicate logic processes can be layered or arranged in a hierarchy similar to predicate logic agents in cluster system 200 and 300.

In block 530, a predicate logic operation is performed. It is appreciated the predicate logic operation can include a variety of operations (e.g., threshold operation, Boolean operation, etc.). A predicate logic operation can include a threshold operation that determines if a requisite number of resources are online. A predicate logic process can include a Boolean logic operation that determines if the status of a requisite number of resources satisfy a Boolean relationship. A predicate logic operation can include a comparative operation.

In block 530, results of the predicate logic operation are forwarded. In one embodiment, results of the predicate logic operation are forwarded to an engine. The results of the predicate logic operation can also be forwarded to an another predicate logic process. Again, the predicate logic processes can be layered or arranged in a hierarchy similar to predicate logic agents in cluster system 200 and 300.

FIG. 6 is a flow chart of an exemplary predicate logic process 600 in accordance with one embodiment of the present invention. In one embodiment, predicate logic process 600 is similar to predicate logic process 500, except predicate logic process 600 includes a supplemental process. Blocks 610, 620, 630, and 640 are similar to block 510, 520, 530 and 540. In block 650 a supplemental process is performed. In one embodiment the supplemental process includes notifier scripts to allow building of complex logic to action workflow. The supplemental process can be triggered by the engine based upon receipt of an update from the predicate logic agent (e.g., an indication of the predicate logic agent state, offline, online, etc.). A change in an update from the predicate logic agent can be caused by a variety of things (e.g., an offline state can be due to a fault, resource not operating correctly, a predicate logic condition not being satisfied, etc.). In one exemplary implementation, the engine triggers the supplemental process by communicating with a notifier that implements a script and sends out a notification. In one embodiment, SNMP e-mail as well as an SMTP trap of notification is supported in addition to log messages. In one embodiment, a notification event is customizable and scripts that take specific actions can be launched in response to those events.

The utilization of predicate logic processes or agents outside the engine with notfiier scripts in the engine enables customizable and complicated workflows to be implemented relatively easily with flexibility and scalability. It is appreciated that the notifier scripts can facilitate the implementation of a variety of specific actions. In one embodiment, if an entire group does not fault but a subset still within a predicate logic threshold does fault, a notifier script can forward a message to proclaim or notify the status upward using the scripts and active repair work can be performed in an effort to avoid an eventual fault altogether. In one exemplary implementation, there are 11 NICs in a system and a predicate logic process is satisfied and reports to the engine process that 7 NICs are online, however three of the resource interaction processes associated with 3 of the 11 NICs are offline. The engine process can implement a notifier script to attempt to get the 3 NICs back online in case any of the other online NICs fail and the available online system NICs "fall" below the predicate logic threshold.

Figure 7:
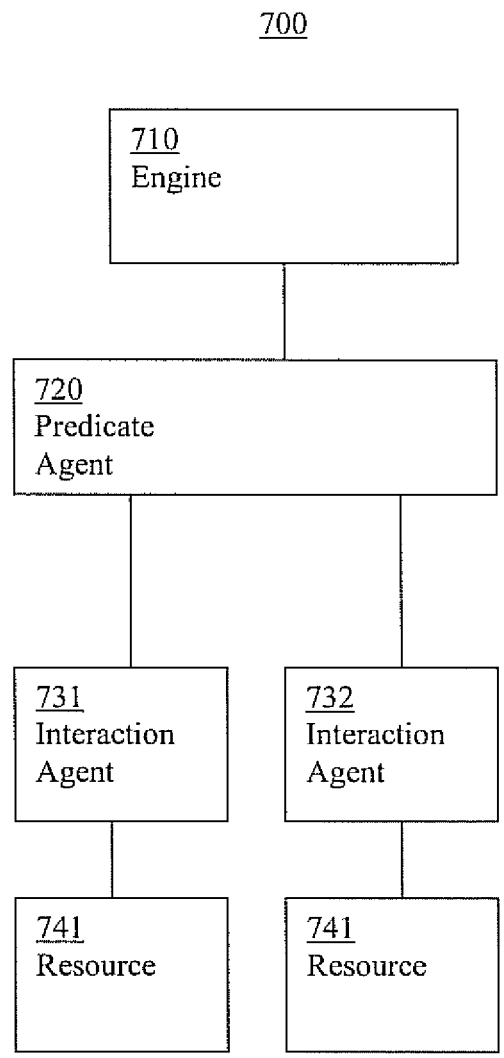
FIG. 7 is a block diagram of an exemplary cluster system in accordance with one embodiment of the present invention.

Again it is appreciated there are a variety of cluster system configurations. FIG. 7 is a block diagram of exemplary cluster system 700 in accordance with one embodiment of the present invention. Cluster system 700 includes engine 710, predicate logic agent 720, resource interaction agent 731, resource interaction agent 732, resource 741, resource 742. Engine 110 is communicatively coupled to predicate logic agent 720 which is coupled to interaction agent 731 and interaction agent 732. Interaction agent 731 and interaction agent 732 are coupled to resources 741 and 742 respectively.

The components of cluster system 700 cooperatively operate to perform cluster operations similar to cluster system 100, except engine 710 forwards requests to predicate logic agent 720 which in turn forwards the requests to resource interaction agents 731 and 732. The engine 710 is notified by predicate logic agent 720 if the predicate logic condition is satisfied.

In one embodiment, a cluster system or method can allow a cluster architecture to go beyond the traditional "resource dependency" notions to allow much more complicated decision trees. In one exemplary implementation, Ri and Qi are cluster resources and various predicate logic conditions can be implemented. The predicate logic condition can include R1 or at least 2 of R2 . . . R10 is online. The predicate logic condition can include either R1 and R3 or R2 and R4 is online. The predicate logic condition can include n among R1 . . . R10 are up at least at least 2n of Q1 . . . Q20 must also be up. The predicate logic condition can include exactly n of R1 . . . R10 must be up (for n=1, this is XOR).

It is appreciated that cluster systems and methods (e.g., 100, 400, 700, etc.) can include handling dependencies. In one embodiment, a request to change the state of a resource (e.g., bring online, bring offline, etc.) can dependent on other components (e.g., the state of another resource, the state of a service group, whether a predicate logic condition is satisfied, etc.). In one exemplary implementation, whether a request to bring an IP address online is issued is dependent upon the state of one or more communication ports. In one example, the request to bring an IP address online is not issued unless a predicate logic condition of one or more communication ports on line is satisfied. A dependency can be handled by an engine or by a predicate logic agent or process.

Figure 11:
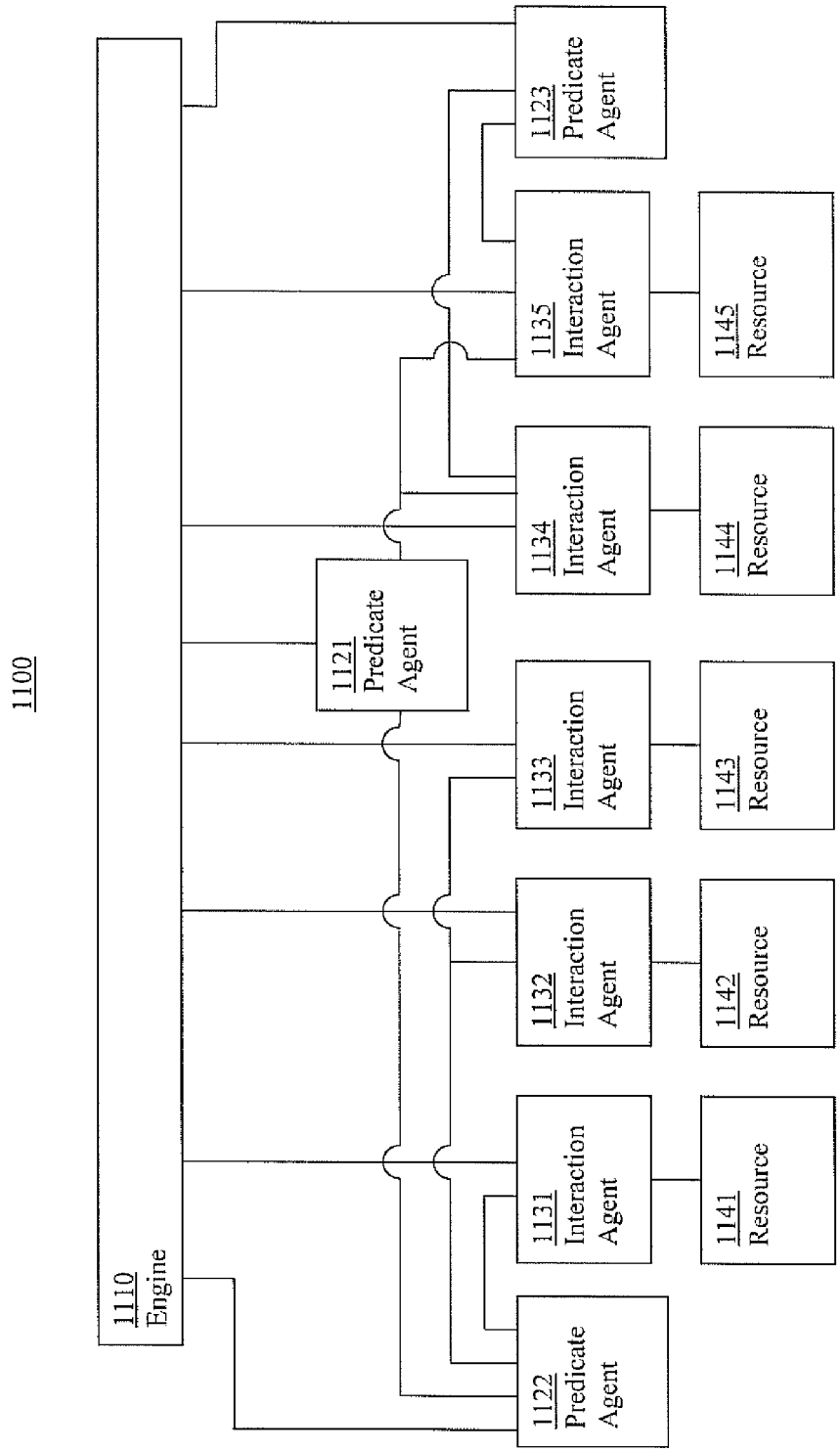
FIG. 11 is a block diagram of another exemplary cluster system in accordance with one embodiment of the present invention.

FIG. 11 is a block diagram of exemplary cluster system 1100 in accordance with one embodiment of the present invention. In one embodiment, cluster system 1100 can handle a dependency. In one exemplary implementation, the dependency includes resources 1144 and 1145 not being brought online if predicate logic agent 1122 conditions are not satisfied.

Cluster system 1100 includes engine 1110, predicate logic agent 1121, predicate logic agent 1122, predicate logic agent 1123, resource interaction agent 1131, resource interaction agent 1132, resource interaction agent 1133, resource interaction agent 1134, resource interaction agent 1135, resource 1141, resource 1142, resource 1143, resource 1144 and resource 1145. Engine 1110 is communicatively coupled to predicate logic agent 1122, predicate logic agent 1123, and interaction agents 1131, 1132, 1133, 1134 and 1135. Predicate logic agent 1122 is communicatively coupled to resource interaction agents 1131, 1132, and 1133. Predicate logic agent 1123 is communicatively coupled to resource interaction agents 1134 and 1135. Interaction agents 1131, 1132, 1134 and 1135 are communicatively coupled to resources 1141, 1142, 1143 and 1145 respectively. Predicate logic agent 1121 is communicatively coupled to engine 1110, predicate logic agent 1122 and resource interaction agents 1134 and 1135.

The components of cluster system 1100 cooperatively operate to perform cluster storage operations. Many of the components of cluster system 1100 are similar to components of cluster system 100. Engine 1110 is similar to engine 110. Resource interaction agents 1131, 1132, 1133, 1134, and 1135 are similar to resource interaction agents 131, 132, 133, and 134. Resources 1141, 1142, 1143, 1144 and 1145 are similar to resources 141, 142, 143, and 144. Predicate logic agents 1122 and 2223 can perform predicate logic operations similar to predicate logic agent 120. Predicate logic agents 1122 performs predicate logic operations based upon information received from the resource interaction components 1131, 1132 and 1133. Predicate logic agents 1123 performs predicate logic operations based upon information received from the resource interaction components 1134 and 1135.

In one embodiment, interaction agents 1134 and 1135 are not requested to turn on resources 1144 and 1145 unless the predicate logic condition of predicate logic agent 1122 is satisfied. Requests to turn on resources 1144 and 1145 can be controlled by engine 1110 or predicate logic agent 1121 based upon information from predicate logic 1122. In one exemplary implementation, engine 1110 does not request resources 1144 and 1145 to be turned on unless predicate logic agent 1122 is online. In another exemplary implementation, requests to turn on request resources 1144 and 1145 are sent or "filtered" through predicate logic agent 1121 and are forwarded or "passed on" if predicate logic agent 1122 is online and not forwarded or "passed on" if predicate logic agent 1122 is offline.

FIG. 8 is a block diagram of exemplary cluster module 800 which includes instructions for directing a processor in the performance of a cluster method in accordance with one embodiment of the present invention. In one embodiment, exemplary cluster module 800 includes instructions for directing a processor in the performance of a cluster method 100. Cluster method module 800 includes engine module 810, a resource interaction module 820 and predicate logic module 830. Engine module 810 includes instructions for performing an engine process. In one embodiment, engine module 810 includes instructions for performing an engine process as indicated in block 410. Resource interaction module 820 includes instructions for performing a resource interaction process. In one embodiment, resource interaction module 820 includes instructions for performing a resource interaction process as indicated in block 420. Predicate logic module 810 includes instructions for performing a predicate logic process. In one embodiment, predicate logic module 830 includes instructions for performing a predicate logic process as indicated in block 430.

Figure 9:
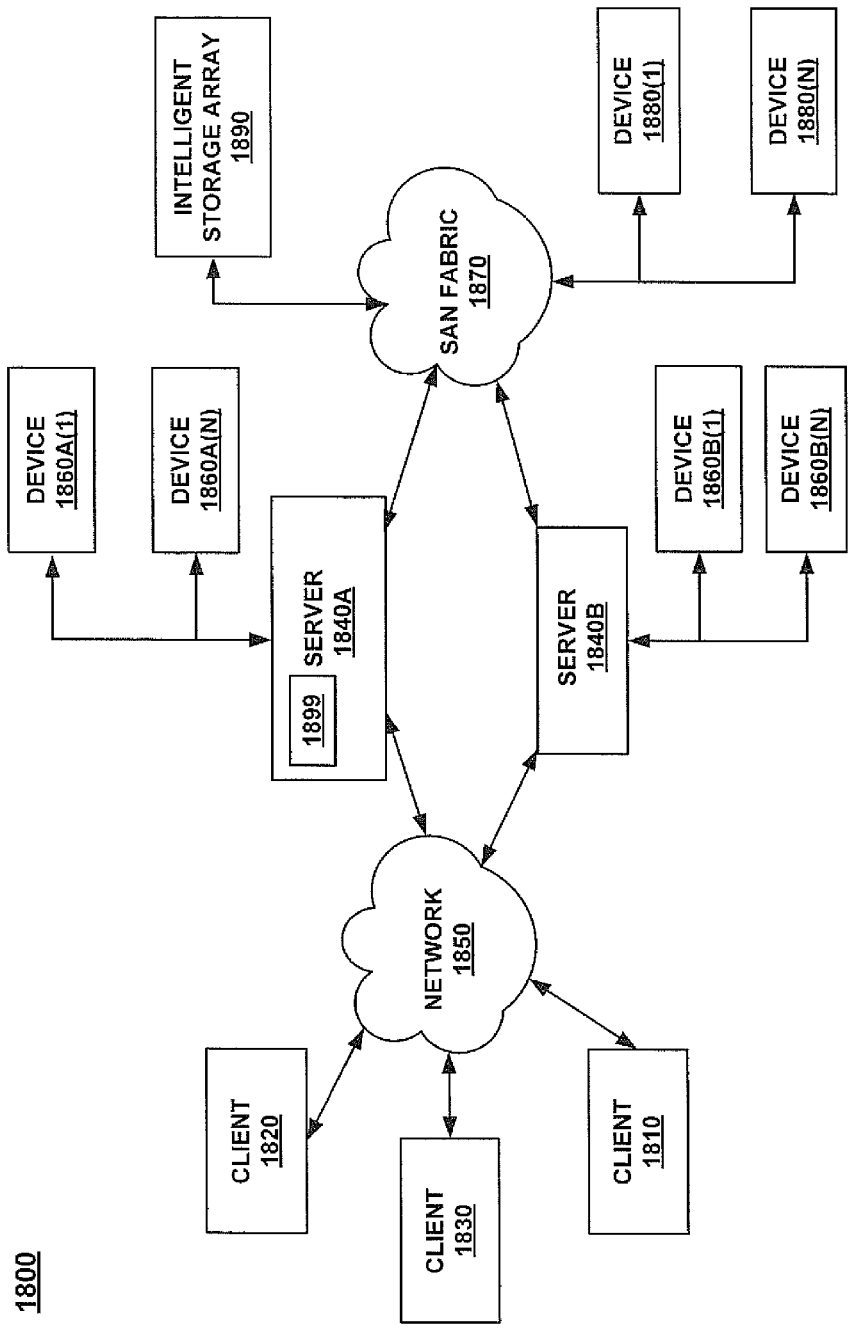
FIG. 9 is a block diagram depicting an exemplary network architecture in accordance with one embodiment of the present invention.

It is appreciated present cluster systems and methods can be implemented as part of a variety of environments. For example, cluster systems and methods can be implemented as part of a distributed computing environment, a cloud computing environment, a virtual environment, a client server environment, etc. In one embodiment, an information cluster method (e.g., cluster method 100, etc.) can be implemented on a network. FIG. 9 is a block diagram depicting an exemplary network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A(1)-(N) directly attached, and storage server 1840B is depicted with storage devices 1860B(1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and also by client systems 1810, 1820 and 1830 via network 1850. Intelligent storage array 1890 is also shown as an example of a specific storage device accessible via SAN fabric 1870. In one embodiment, server 1840A includes cluster module 1899. In one embodiment, cluster module 1899 is similar to variable cluster module 800. It is appreciated that present systems and methods are compatible with a variety of implementations. For example, portions of information and instructions associated with can be distributed in various resources.

Figure 10:
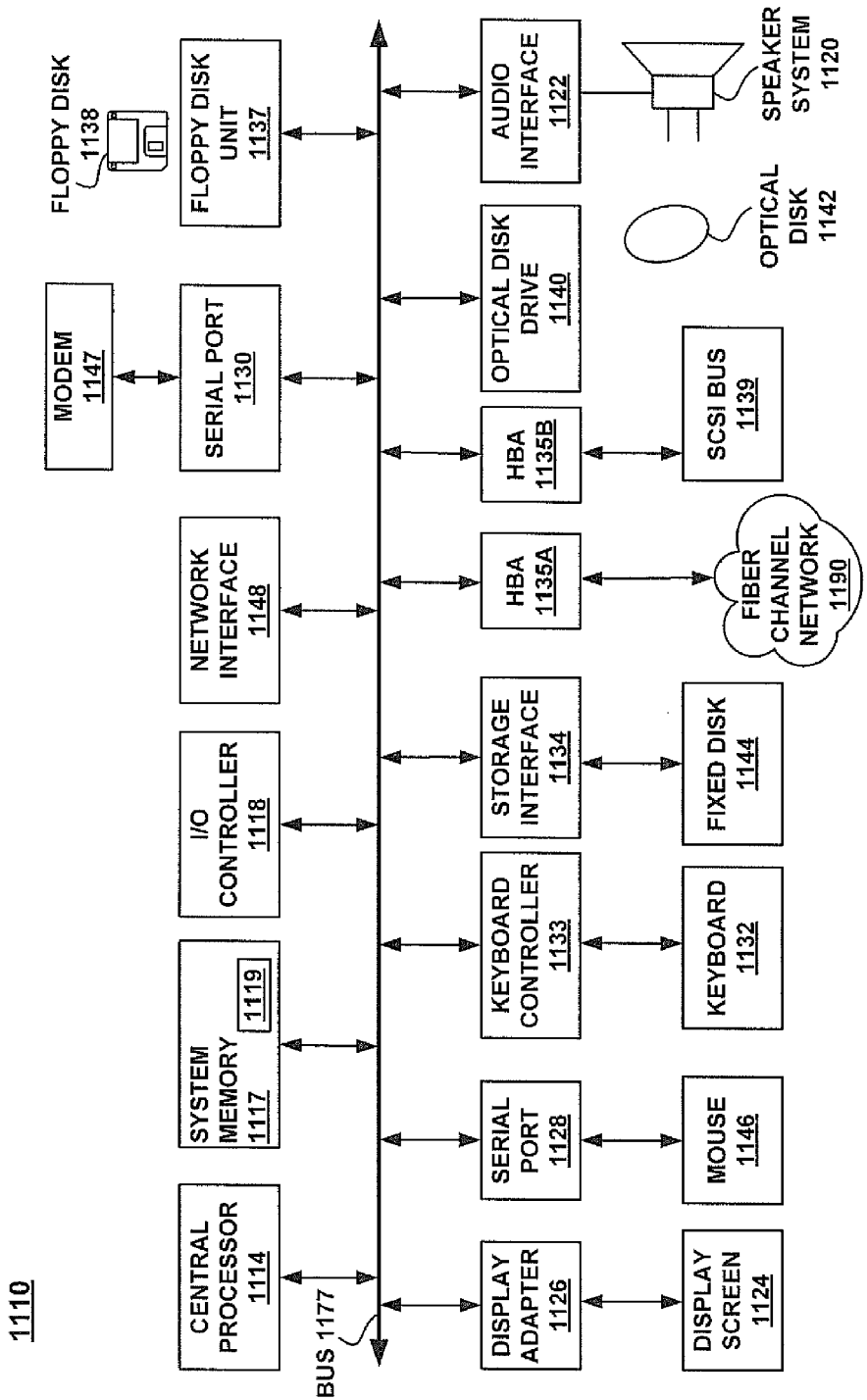
FIG. 10 depicts a block diagram of an exemplary computer system suitable for implementing the present methods in accordance with one embodiment of the present invention.

FIG. 10 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing an information cluster method (e.g., similar to method 100, etc.) are stored in one or more memories of computer system 1100 (e.g., in memory location 1119). The RAM is generally the main memory into which the operating system and application programs are loaded. In one embodiment, RAM 1117 includes a cluster module (e.g., in memory location 1119). In one embodiment, a cluster module stored in memory location 1119 is similar to cluster module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 9 depicts the use of a network such as the Internet for exchanging data, but the present disclosure is not limited to the Internet or any particular network-based environment.

Thus, the presented systems and methods described above can facilitate efficient and effective cluster configuration. In one embodiment, easily extendable logic blocks can run or execute logic operations based on states (e.g., online, offline, etc.) of cluster resources. The systems and methods enable functionality extension of cluster core policies. The systems and methods can include flexible and scalable predicate logic implementation with minimal or no changes to engine mechanisms. Cluster systems can be conveniently and flexibly expanded to enable predicate logic operations to be executed around states of cluster resources. The core logic of resource dependency can be freely extended in a versatile and elegant manner. The extension can be implemented with minimal or no alteration of an engine or engine process. The predicate logic systems and methods can make high availability (HA) solutions extensible and support for user environments can become easier and faster to handle. The predicate logic systems and methods can make the implementation of new requirements very rapid and convenient.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A cluster method comprising:
   issuing requests to bring a resource online, offline, and monitor the resource, wherein the requests are issued by at least one processor in an engine;
   interacting with the resource and directing the resource to comply with the requests, wherein the resource interactions are performed by at least one processor in a resource interaction agent; and
   performing predicate logic operations to determine if a predicate logic condition associated with the resource is satisfied and forwarding an indication of the results of the predicate logic operations to the engine, wherein the predicate logic operations are performed by at least one processor in a predicate logic agent, wherein the predicate logic agent is disposed between and separate from the engine and the resource interaction agent.

2. The cluster method of claim 1 wherein the predicate logic operations utilize information from the resource interactions in determining if the predicate logic condition associated with the resource is satisfied.

3. The cluster method of claim 1 wherein the predicate logic operations forward an indication that the predicate logic agent is online if the predicate logic condition is satisfied and forwards an indication that the predicate logic agent is offline if the predicate logic condition is not satisfied.

4. The cluster method of claim 1 wherein the predicate logic operations include a threshold operation that determines if a requisite number of resources are online.

5. The cluster method of claim 1 wherein the predicate logic operations include a Boolean logic operation that determines if the status of a requisite number of resources satisfy a Boolean relationship.

6. The cluster method of claim 1 wherein the predicate logic operations include a comparative operation.

7. The cluster method of claim 1 wherein a notifier script is performed in response to information from the resource interactions.

8. A reprogrammable non-transitory computer readable storage medium having stored thereon computer executable instructions that when executed by at least one computer processor cause the at least one computer processor to perform a method comprising:
   issuing requests o bring a resource online, offline, and monitor the resource, wherein the requests are issued by an engine;
   interacting with the resource and directing the resource to comply with the requests, wherein the resource interactions are performed by a resource interaction agent; and
   performing predicate logic operations to determine if a predicate logic condition associated with the resource is satisfied and forwarding an indication of the results of the predicate logic operations to the engine, wherein the predicate logic operations are performed by a predicate logic agent, wherein the predicate logic agent is disposed between and separate from the engine and the resource interaction agent.

9. The reprogrammable non-transitory computer readable storage medium of claim 8 wherein the predicate logic operations utilize information from the resource interactions in determining if the predicate logic condition associated with the resource is satisfied.

10. The reprogrammable non-transitory computer readable storage medium of claim 8 wherein the predicate logic operations forward an indication that the predicate logic agent is online if the predicate logic condition is satisfied and forwards an indication that the predicate logic agent is offline if the predicate logic condition is not satisfied.

11. The reprogrammable non-transitory computer readable storage medium of claim 8 wherein the predicate logic operations include a threshold operation that determines if a requisite number of resources are online.

12. The reprogrammable non-transitory computer readable storage medium of claim 8 wherein the predicate logic operations include a Boolean logic operation that determines if the status of a requisite number of resources satisfy a Boolean relationship.

13. The reprogrammable non-transitory computer readable storage medium of claim 8 wherein the predicate logic operations include a comparative operation.

14. The reprogrammable non-transitory computer readable storage medium of claim 8 wherein a notifier script is performed in response to information from the resource interactions.

15. A computer system comprising:
an engine configured to issue requests to bring a resource online, offline, and monitor the resource;
a resource interaction agent configured to interact with the resource and direct the resource to comply with the requests from the engine; and
a predicate logic agent configured to perform predicate logic operations to determine if a predicate logic condition associated with the resource is satisfied and forward an indication of the results of the predicate logic operations to the engine, wherein the predicate logic agent is disposed between and separate from the engine and the resource interaction agent.

16. The computer system of claim 15 wherein the predicate logic operations utilize information from the resource interaction process in determining if the predicate logic condition associated with the resource is satisfied.

17. The computer system of claim 15 wherein the predicate logic operations forward an indication the predicate logic agent is online if the predicate logic condition is satisfied and forwards an indication the predicate logic agent is offline if the predicate logic condition is not satisfied.

18. The computer system of claim 15 wherein the predicate logic operations include a threshold operation that determines if a requisite number of resources are online.

19. The computer system of claim 15 wherein the predicate logic operations include a Boolean logic operation that determines if the status of a requisite number of resources satisfy a Boolean relationship.

20. The computer system of claim 15 wherein the predicate logic operations include a comparative operation.

* * * * *